United States Patent [19]

Khalil

[11] Patent Number: 5,271,081
[45] Date of Patent: Dec. 14, 1993

[54] APPARATUS AND METHOD OF BLOCKING WATER MIGRATION BETWEEN STRANDED SIGNAL CONDUITS

[75] Inventor: Hanna Khalil, Cypress, Tex.

[73] Assignee: Halliburton Geophysical Services, Inc., Houston, Tex.

[21] Appl. No.: 900,358

[22] Filed: Jun. 18, 1992

[51] Int. Cl.⁵ .......................... G02B 6/44; H01B 7/28
[52] U.S. Cl. ................... 385/112; 174/23 R; 174/23 C; 174/110 SR; 174/110 AR; 174/110 FC
[58] Field of Search ......... 174/120 R, 120 SR, 120 C, 174/110 SR, 110 AR, 110 FC, 23 R, 23 C, 8; 385/112

[56] References Cited

U.S. PATENT DOCUMENTS

| | | |
|---|---|---|
| 2,507,508 | 5/1950 | Elliott et al. |
| 2,792,441 | 5/1957 | Platow. |
| 3,236,939 | 2/1966 | Blewis et al. |
| 3,528,852 | 9/1970 | Olson et al. |
| 3,836,695 | 9/1974 | Strecker et al. ................ 174/23 C |
| 3,876,464 | 4/1975 | McNerney ............... 174/120 SR X |
| 4,238,638 | 12/1980 | Cretney et al. ................ 174/23 C |
| 4,466,843 | 8/1984 | Shimirak .................... 174/23 R X |
| 4,538,022 | 8/1985 | Barnicol-Ottler et al. ... 174/120 AR X |
| 4,787,703 | 11/1988 | Tomko et al. ................. 174/23 C |
| 4,791,240 | 12/1988 | Marin et al. .................. 174/23 C |
| 5,095,175 | 3/1992 | Yoshida et al. ................ 174/23 R |
| 5,151,143 | 9/1992 | Downie ......................... 174/23 R |
| 5,166,473 | 11/1992 | Faust et al. .................... 174/23 R |

FOREIGN PATENT DOCUMENTS

| | | | |
|---|---|---|---|
| 906604 | 8/1972 | Canada ........................... 174/23 R |
| 45074 | 4/1977 | Japan ............................. 174/23 C |
| 7410 | 1/1989 | Japan ............................. 174/23 C |
| 1154886 | 6/1969 | United Kingdom ............ 174/23 R |
| 1169797 | 11/1969 | United Kingdom ............ 174/23 R |
| 1229372 | 4/1971 | United Kingdom ............ 174/23 R |

OTHER PUBLICATIONS

Masterson, J. B.; Pressure Dams In Communication Cables; Wire and Wire Products; May 1970, pp. 61-65.
Brochure; Epoxy Adhesives TRA-BONDF113; Tra-Con Inc, Medford, Mass.; 1987.

*Primary Examiner*—Morris H. Nimmo
*Attorney, Agent, or Firm*—Arnold, White & Durkee

[57] ABSTRACT

A method and apparatus for filling a jacketed signal conduit with a blocking material are provided. The blocking material is injected into the jacketed signal conduit such that the blocking material occupies space within the jacketed signal conduit not occupied by the signal conduit. The injected blocking material inhibits fluid intrusion and migration between the signal conduit jacket and the signal conduit.

3 Claims, 2 Drawing Sheets

APPARATUS AND METHOD OF BLOCKING WATER MIGRATION BETWEEN STRANDED SIGNAL CONDUITS

FIELD OF THE INVENTION

The present invention relates to methods of blocking fluid migration between stranded members and more particularly to methods of blocking water migration between stranded signal conductors and most particularly to methods of blocking water migration between stranded signal conductors in seismic cables.

BACKGROUND OF THE INVENTION

Generally, in the process of acquiring seismic data, recording instruments responsive to particle motion are selectively positioned above the subterranean formation of interest. Energy, generated by artificial means, such as for example by explosives, air guns or vibrators, transmitted into the earth imparts motion to the area of the earth proximal to the origin of the seismic energy. The transmitted energy is then reflected and refracted by subsurface geological strata. Reflected and refracted energies are recorded by the receivers, such as geophones or hydrophones, responsive thereto.

For seismic exploration conducted on land or below the surface of the earth such as in a well bore, geophones are generally used to record reflected and refracted energies. For seismic exploration conducted at sea, hydrophones are generally used to record reflected and refracted energies. Whether seismic exploration occurs on land, in a well bore or at sea, both types of receivers, hydrophones and geophones, generally require signal conductors, such as electrical conductors, for interconnecting such receivers and for connecting such receivers to other recording and processing equipment.

Preferably, due to greater flexibility, resiliency, and signal portability, multi-stranded signal conductors are use for seismic exploration. An assembly of signal conductors connected to receivers (hydrophones and/or geophones) is commonly referred to as a "cable array". In many instances, the cable array may consist of a plurality of sub-cable arrays connected together, such as the Ocean Bottom Cable Assembly, a product of Halliburton Geophysical Services.

In many instances, cable arrays are deployed in austere environments. Under these conditions, cable arrays must be designed such that the components, i.e., receivers, signal conductors, and connections between the receivers and signal conductors, remain insulated from such conditions. When designing cable arrays for operation in such austere conditions, preventing the intrusion and migration of a fluid, such as water, within the cable array is a concern.

Generally, the cable array designer may select an elastomer, such as polyurethane or neoprene as a primary insulator which is placed between the receiver or signal conductors and the environment. This is done by jacketing the hydrophones and geophones and capturing the signal conductors with an overlying layer of elastomer. This layer of elastomer may be referred to as the cable array jacket. Further protection may be achieved by inclosing the jacketed cable array in metal. However, this assembly may not be suitable for certain marine applications. Additionally, individually jacketed signal conductors may also be used. In this way, the jacketed cable array may include a bundle of individually jacketed signal conductors.

It is also common, once the jacketed signal conductors are bundled and jacketed to place a fluid blocking material between the jacketed signal conductors and the cable array jacket. Traditional fluid blocking materials include depolymerized rubber, silicon, and urethane fluid. In the event the cable array jacket is opened to the environment, such as by tearing, puncturing etc., these fluid blocking materials provide additional protection from fluid intrusion and migration.

However, the inventor has discovered, notwithstanding the above described measures, fluid intrusion, particularly water intrusion via an opening in the cable array jacket can result in impaired cable array performance. Water intrusion and migration may not only degrade the performance of receivers adjacent the jacket opening but may, if the conductors within the jacketed cable array are also exposed to the environment, render the entire array or sub-array inoperative. In such circumstances, the inventor has discovered that water migration occurs not only between the cable array jacket and the signal conductors jacket but also between the signal conduit jacket and the signal conductors. Thus, there exist a need for preventing fluid intrusion and migration between the signal conductors jacket and the signal conduit.

SUMMARY OF THE INVENTION

Accordingly, it is the general purpose and object of the present invention to provide a method of blocking fluid intrusion and migration between a conductors jacket and the conduit. Generally this invention provides a method of blocking fluid migration within a jacketed conductors, such as a jacketed signal conduit, by filling the jacketed conductors with a blocking material such that the blocking material occupies space within the jacketed conductors not occupied by the conduit. When the jacketed conductors consists of a jacket overlying a single strand conductors, the blocking material occupies the space between the jacket and the conductors. When the jacketed conductor consists of jacket overlying a multi-strand conductors, the blocking material occupies the space between individual conductors strands as well as the space between the jacket and the multi-strand conductor. The preferred method of placing the blocking material between the conductor jacket and the conductors, is by urging, such as by injecting, the blocking material into the jacketed conductor.

DETAILED DESCRIPTION OF THE PREFERRED EMBODIMENTS

Figure 1:
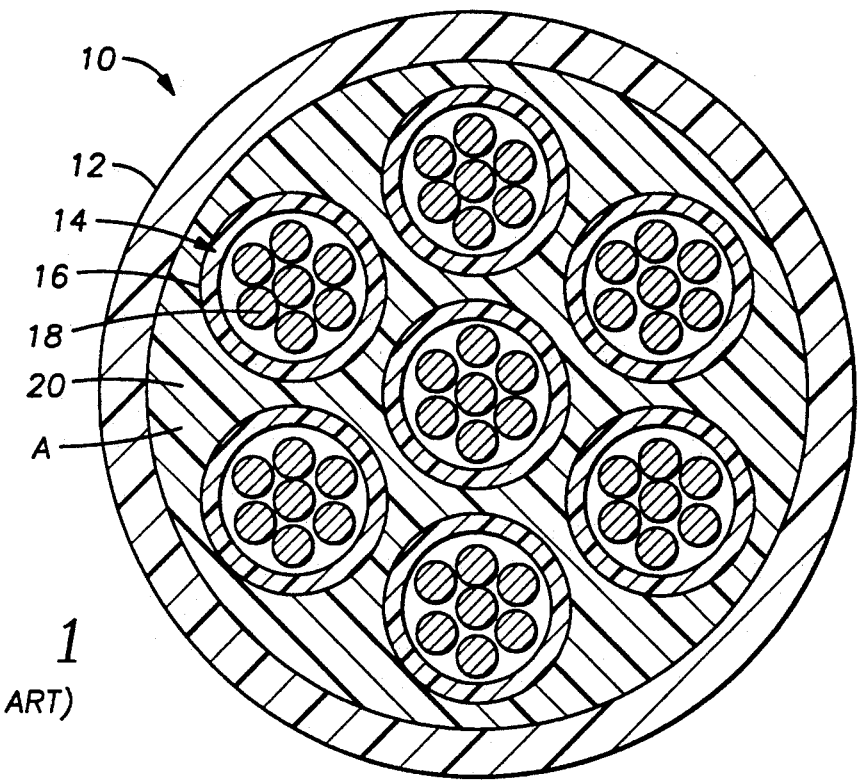
FIG. 1 is a horizontal cross section of a prior art jacketed signal conductor cable illustrating the placement of a first blocking material between a cable jacket and individual signal conductor jackets.

A typical cross sectional view of a jacketed signal conductor cable 10 is shown in FIG. 1. The jacketed signal conductor cable 10 includes a cable jacket 12 capturing a plurality of jacketed signal conductors 14. Each jacketed signal conductor 14 includes a signal conductor jacket 16 and a plurality of signal conductors strands or members 18. The cable jacket 12 is generally made from an elastomer such as polyurethane or neoprene. The signal conductor jacket 16 is generally made of ethylene polypropylene copolymer and polyethylene. The signal conductor strands 18 may be constructed of material suitable for conducting a signal, such as metal (copper, aluminum, cad bronze and copper covered steel), fiber optic materials, etc.

A blocking material 20 occupies space A. Space A is generally defined as the area between the cable jacket 12 and the signal conductor jackets 16. The blocking material 20 is generally made of rubber, silicon or urethane.

Figure 2:
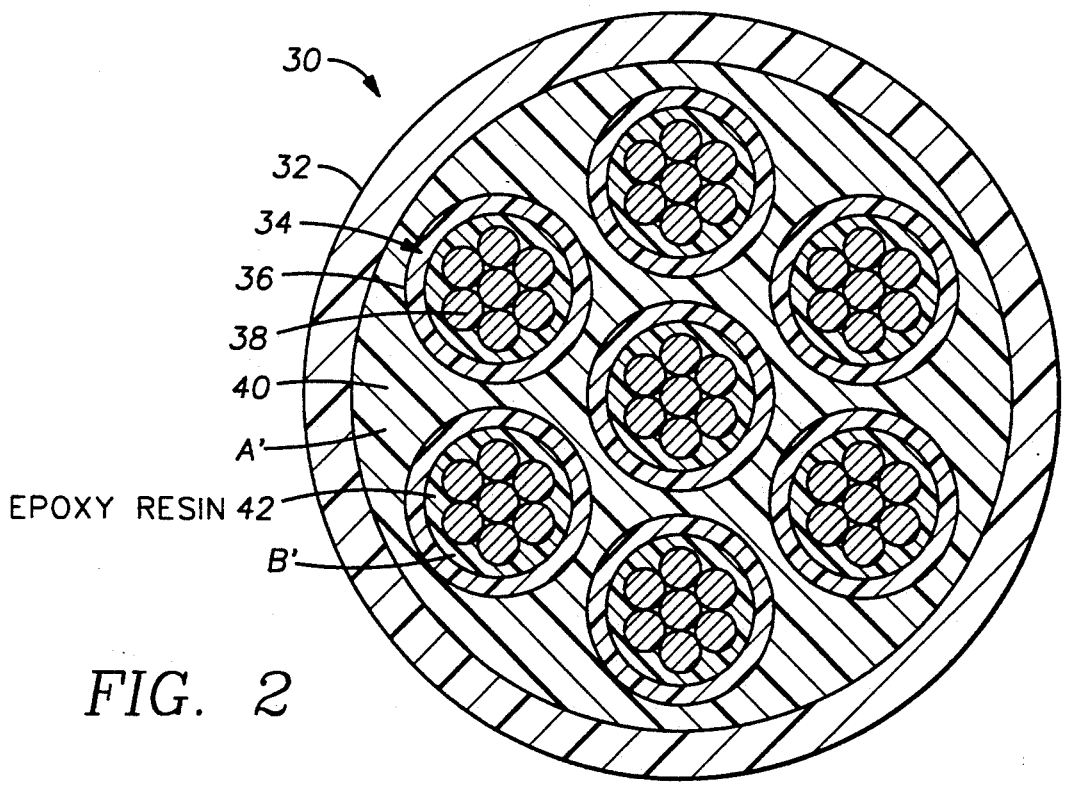
FIG. 2 is a horizontal cross section of a jacketed signal conductor cable illustrating the placement of a first blocking material between the cable jacket and individual signal conductor jackets and a second blocking material between the signal conductor jacket and the signal conductor.

Referring now to FIG. 2, a jacketed signal conductor cable after applying the method of the present invention is shown therein and designated by the general reference numeral 30. The jacketed signal conductor cable 30 includes a cable jacket 32 capturing a plurality of jacketed signal conductors 34. Each signal conductor 34 includes a signal conductor jacket 36 and a plurality of signal conductors strands or members 38.

The jacketed signal conductor cable 30 further includes a first blocking material 40. The first blocking material 40 occupies spaces A'. Space A' is generally defined as the area between the cable jacket 32 and the signal conductor jackets 36.

The cable jacket 32, signal conductor jacket 36, the signal conductor 38 and the first blocking material 40 are constructed of materials similar to those used in corresponding structure of the jacketed signal conductor cable 10.

A second blocking material 42 occupies space B'. Space B' is generally defined as the area or space within the jacketed signal conductor 34 between the signal conductors jackets 36 and the signal conductor strands 38. In other words, space B' is the area or space within the jacketed signal conductor 34 not occupied by the signal conductor strands 38. The second blocking material 42 is generally made of a resin, and preferably of an epoxy resin, and more particularly of a curable epoxy resin and most particularly of an epoxy resin manufactured by TRA-CON, Inc. (Medford, MA.) and designated as TRA-BOND F-113.

As will be described in greater detail below, if the method of filling the spaces B' between the signal conductor jackets 36 and the signal conductor strands 38 is by injection, the second blocking material 42 should preferably exhibit sufficiently long pot-life and a low viscosity (preferably between about 100 cps to 10,000 cps) in the uncured state. For purposes of the present invention, the second blocking material may either be electrically conductive or non-conductive. If the jacketed signal conductor cable 30 is to be employed in austere environments, the second blocking material 42 should also exhibit good impact strength properties, broad temperature range tolerances and be sufficiently resistant to temperature changes, pressure changes, salt water, acids, bases and other associated chemicals common to energy exploration.

In accordance with the present invention, the method of blocking fluid migration between the signal conductor jacket and the signal conductor includes substantially filling the jacketed signal conductor with the second blocking material such that the second blocking material occupies space within the jacketed signal conductor not occupied by the signal conductor. The preferred method of substantially filling the jacketed signal conductor with the second blocking material is by urging, such as by injection, of the second blocking material between the signal conductor jacket and the conductor.

Generally the method of urging the blocking material into the jacketed conductor includes contacting a first portion of the jacketed conductor, preferably a first end of the jacketed conduit, with a quantity of blocking material such that the jacket and the conductor adjacent said first portion contact the blocking material. The jacketed conductor is then positioned between two environments; a first environment having a first pressure and a second environment having a second pressure.

The first portion of the jacketed conductor in contact with the blocking material and the blocking material are in contact with the first environment. A second portion of the jacketed conductor, preferably a second end of the jacketed conductor, contacts the second environment. Preferably the jacket adjacent to the second portion is open to the second environment and more preferably the jacket and the conductors adjacent the second portion contact the second environment.

The pressures of the first and second environments are then selectively controlled such that the blocking material is urged between the conductor jacket and the conductors adjacent the first portion and travels a distance within the jacketed conductor from the first portion of the jacketed conductor towards the second portion of the jacketed conductor.

Figure 3:
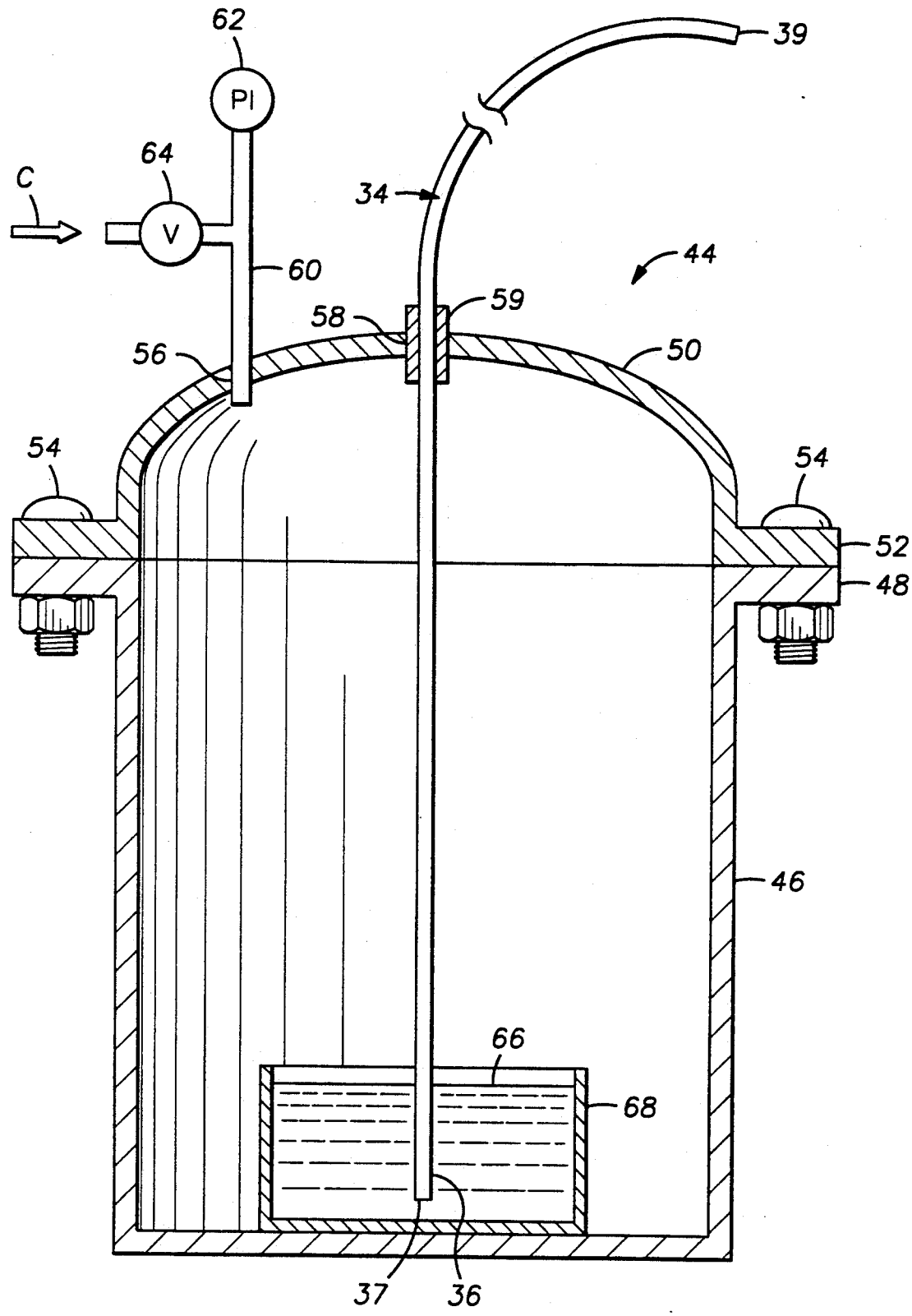
FIG. 3 is a schematic illustration of an apparatus for urging the second blocking material between the signal conductor jacket and the signal conductor.

Referring now to FIG. 3, a rigid pressure vessel 44 suitable for injection of the second blocking material between the signal conductors jacket and the conductors is illustrated. The pressure vessel 44 includes a rigid canister 46 having a circumferential outwardly extending shoulder 48 and a rigid canister lid 50 having a circumferential outwardly extending shoulder 52. The pressure vessel is sealed by mattingly engaging the facing surfaces of shoulders 48 and 52 and tightening fasteners 54. It is understood by those skilled in the art that one or more seals, such as an "O" ring (not shown), may be positioned between the facing surfaces of shoulders 48 and 52.

The canister lid 50 also includes a gas port 56 and a jacket signal conductor port 58. A sealing means 59 is positioned in the conductor port 58 and secured to the canister lid 50. The sealing means 59 sealingly engages one or more jacketed signal conductors 34 such that gas cannot travel between the jacketed signal conductor 34 and sealing means 59. The sealing means 59 should not however engage the jacketed signal conductor 34 such that second blocking material cannot advance within portions of the jacketed signal conductor 34 adjacent the sealing means 59. FIG. 3 illustrates a single jacketed signal conductors 34, however it will be readily appreciated by those skilled in the art that a plurality of jacketed signal conductors, a single jacketed signal conductor cable (FIGS. 1 and 2) or a plurality of jacketed signal conductor cables may extend through the signal conductor port 58.

A gas line 60 is positioned in gas port 56 and sealingly secured to the canister lid 50. The gas line 60 includes a pressure gauge 62 and a valve 64. The valve 64 directs the flow compressed gas into the pressure vessel 44 from a compressed gas source C and out of the pressure vessel 44.

In practicing the preferred method of filling, a first end 37 of the jacketed signal conductor is prepared such that the signal conductors jacket 36 and the signal conductor (not shown) contact a quantity of uncured second blocking material 66. The second blocking material 66 is preferably placed in a container 68 which rests on the inside floor of the canister 46. The portions of the jacketed signal conductor 34 extend through the signal conductors port 58 such that a second end 39 of the jacketed signal conductor 34 is exposed to the ambient atmosphere. The second end 39 of the jacketed signal conductor 34 is prepared such that both the signal conductors jacket 36 and the signal conductor (not shown) are exposed to the ambient atmosphere. The conductor port 58 is sealed about the jacket signal conductor 34 as described above and the pressure vessel 44 is sealed by tightening fasteners 54 so as to sufficiently compress the facing surfaces of shoulders 48 and 52.

The valve 64 is then positioned such that pressurized gas enters the pressure vessel 44. Inert gases as well as air are suitable for this purpose. As the pressure builds inside the pressure vessel 44, the uncured second blocking material 66 is urged into the jacketed signal conductor 34 from the first end 37 towards the second end 39. Preferably, the filling process is complete when the second blocking material is detected at the second end 39 of the jacketed signal conductor 34.

When sufficient quantities of the second blocking material have been introduced into the jacketed signal conductor 34, the gas pressure is bled from the pressure vessel 44 by valve 64 and the jacketed signal conductor 34 is removed therefrom. The curing time of the injected second blocking material will depend upon the particular materials used.

When the second blocking material is F-113 TRA-BOND, pressurizing the vessel 44 to about 40 psi of compressed air for about 30 minutes is sufficient to urge this second blocking material through a 24" length of ethylene polypropylene copolymer leader-jacketed signal conductor cable having six (6) jacketed signal conductors therein. Curing time for F-113 TRA-BOND after insertion into the jacketed signal conductor is about 24 hrs. at room temperature or about 4 hrs. at 65° C. It will be readily apparent to those skilled in the art, as curing times may vary between materials used for the second blocking material, pressure vessel pressures will also depend upon the pot life and viscosity of such materials as well as the cross sectional area of the signal conductor and jacketed signal conductors, the number of signal conductor strands within the jacketed signal conductor, the number of jacketed signal conductors treated, and the number of signal conductor cables treated.

It will be clear that the present invention is well adapted to carry out the objects and attain the ends and advantages mentioned as well as those inherent therein. While the specification and description disclose apparatus and methods of blocking fluid migration in jacketed signal conductors, it will be readily apparent to those skilled in the art that the present invention is equally suitable for blocking fluid migration between either a single non-conductive member or a plurality of stranded non-conductive members and an overlying jacket structure. Therefore, while a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. A water-resistant signal carrying apparatus comprising:
   (a) a cable array including multiple transmission lines, wherein each line includes
      (1) a multi-stranded signal conductor;
      (2) a first jacket surrounding the signal conductor and cooperating with the signal conductor to define a first space; and
      (3) a first blocking material occupying the first space such that fluid intrusion between the first jacket and the signal conductor is inhabited, the first blocking material comprising a curable epoxy resin having viscosity between 100 centipoise and 10,000 centipoise;
   (b) a second jacket surrounding the cable array and cooperating with the cable array to define a second space; and
   (c) a second blocking material occupying the second space such that fluid intrusion between the second jacket and the cable array is inhibited.

2. The apparatus of claim 1, wherein the signal conductors comprise fiber optic lines.

3. The apparatus of claim 2, wherein the signal conductors comprise one or more electrically conductive materials.

* * * * *

UNITED STATES PATENT AND TRADEMARK OFFICE
CERTIFICATE OF CORRECTION

PATENT NO. : 5,271,081
DATED : Dec. 14, 1993
INVENTOR(S) : Hanna Khalil

It is certified that error appears in the above-indentified patent and that said Letters Patent is hereby corrected as shown below: On the title page: Item [54] and Column 1, line 3, In the Title, "CONDUITS" should be --CONDUCTORS--.
In the Assignee, "Halliburton Geophysical Services" should be
   --Western Atlas International--.
In the Abstract, each occurrence of "conduit" should be --conductor--.
Column 1, line 4, "CONDUITS" should be --CONDUCTORS--;
         line 41, "use" should be --used--.
Column 2, line 4, between "jacketed" and "to", insert a comma;
         lines 25, 28, 35, 37 and 41, each occurrence of "conduit"
            should be --conductor--;
         line 26, "exist" should be --exists--;
         line 45, between "of" and "jacket", insert --a--.
Column 4, line 20, the semicolon should be a colon.
Column 5, line 4, between "flow" and "compressed", insert --of--.
Column 2, lines 24, 27, 34, 37, 38, 40, 41, 42, 44, 45, 47 and 50,
    Column 3, lines 9, 30 and 44, Column 4, lines 30, 35, 41, 42
    and 63, Column 5, lines 9, 15 and 19, and Column 6, line 3,
    each occurrence of "conductors" should be --conductor--.

Signed and Sealed this

Twenty-fourth Day of October, 1995

Attest:

BRUCE LEHMAN

Attesting Officer
Commissioner of Patents and Trademarks